Patented Jan. 23, 1951

2,538,900

UNITED STATES PATENT OFFICE 2,538,900

PLASTICIZING COMPOSITIONS AND PLASTICIZED PRODUCTS

Joseph R. Ehrlich, New York, N. Y.

No Drawing. Application June 7, 1946,
Serial No. 675,301

3 Claims. (Cl. 260—45.5)

My invention relates to new and improved plasticizing compositions, and to plasticized products which are made with the use of such plasticizing compositions. The materials which can be plasticized by means of the improved plasticizing compositions include plastics, including rubbers. The designation "plastics" includes synthetic resins, natural rubber, and synthetic rubbers such as the copolymer of butadiene and styrene. I can also plasticize natural resins.

As examples, and without limiting the scope of the invention, I can plasticize plastics such as cured and uncured zein, ethyl cellulose, polystyrene, natural rubber, synthetic rubbers such as a synthetic rubber produced by the copolymerization of butadiene and styrene, polymerized isobutylene, chlorinated rubber, acrylic resins, polyvinyl polymers, and synthetic resins such as the cumar-indene resins and other resins which are included in the designation "plastics." I can also plasticize rosin, copals and other natural resins.

By means of the improved plasticizing compositions, I can plasticize said copolymer synthetic rubber and render it tacky, which has heretofore been impossible or at least very difficult. This tacky plasticized copolymer synthetic rubber can be used as a binder, as an adhesive, and for many other purposes. The improved plasticized products, such as said plasticized copolymer synthetic rubber, can be made in a wide range of physical properties, such as viscosity and flow. The improved plasticized products such as plasticized natural rubber and said plasticized copolymer synthetic rubber can be cured, and additional compounding ingredients can be added to the products which are to be plasticized, as prior to plasticizing and curing, so as to produce final articles of permanent shape, which are either rigid or flexible. The final plasticized products can also be compounded with numerous ingredients so as to provide coating and impregnating compositions which can be applied to fabrics and other articles.

One of the great advantages of my improved plasticizers is that they eliminate "cold flow" in the plasticized material. By "cold flow," I refer to the distortion which plastics undergo, when they are subjected to load at 25° C. or other low temperatures. The mechanical strength of the plasticized material, including its tensile strength, is greatly improved, and the plasticized material is made less brittle.

At a temperature of 25° C., the improved plasticizers are rubber-like masses, which have tensile elasticity and torsional elasticity. If a part of such mass is pulled away from the body of such mass in the form of a strand, such strand has longitudinal and torsional elasticity. When such pulled-out strand is released, it returns into the body of such mass, and such released strand then coalesces with such mass.

The improved plasticizing compositions are made by dissolving polymerized acrylic resins in solvents which are later stated herein. These polymerized acrylic resins are exemplified by polymerized methyl methacrylate resin or polymethyl methacrylate, which is described at pages 153–154 of said "Handbook of Plastics."

This well-known polymerized methyl methacrylate resin is soluble in numerous liquid solvents of low boiling point, such as ethylene dichloride, ketones, aliphatic acids, etc.

According to my invention, I dissolve said polymethyl methacrylate resin in a solvent which has the following characteristics:

(a) It is a plastizing solvent for said resin and it is a plasticizer for the material to be finally plasticized such as natural rubber, said copolymer of butadiene and styrene, ethylcellulose, etc.;

(b) It can preferably dissolve up to 10% by weight of said polymethyl methacrylate resin at 130° C.–200° C. to give a transparent or substantially transparent solution under normal pressure of 760 mm. of mercury;

(c) It is substantially non-volatile under normal conditions, so that the solution is stable;

(d) When such solution is cooled from the elevated temperature of solution to normal room temperature of 25° C., the solution is a rubber-like and permanently thermoplastic mass. Such mass has longitudinal and torsional stretch and elasticity at 25° C. When a strand of such mass is pulled out of the body of such mass, such strand has longitudinal and torsional elasticity. When such strand is released, it springs back into the body of the mass, and it coalesces with the body of such mass.

When such rubber-like solution is heated, as to 80° C.–100° C., it becomes a spreadable liquid. When heated to higher temperatures, as to 150° C.–160° C., said rubber-like mass becomes a pourable liquid.

The rubber-like solution is stable and it can be repeatedly heated to flowable liquid form and then cooled to 25° C., without separating.

At 25° C., such rubber-like solutions have little or no adhesion to the human skin, so that they are non-tacky or substantially non-tacky.

At 25° C., the rubber-like solutions are light-permeable in layers of various thickness, depending on their composition.

Many solvents for said polymethyl methacrylate resin are not suitable for the purposes of this invention, because they do not produce said rubber-like masses at 25° C. These unsuitable solvents include tributyl phosphate, tributyl phthalate, dibutyl sebacate. For example, when a clear solution of said polymethyl methacrylate resin is made in tributyl phosphate at 130° C.–200° C., and said solution is cooled to 25° C., the solution is a milky cake, with separation of the solvent. This applies to the other unsuitable solvents.

The suitable solvents which I can use include tricresyl phosphate, dibutyl tartrate, and certain elastic thermoplastic hydrocarbon resins, and phenol indene cumarone indene resins. These elastic thermoplastic hydrocarbon resins consist of styrene, substituted styrene and homologues. They are produced from styrene type materials which also contain homologues of styrene, and substituted styrene. Hence they are polymers of styrene and its homologues. They are produced from crude mixtures of styrene and styrene homologues. One source of such starting material is a fraction of the "crude solvent" from "light oils" which are scrubbed out of coke oven gas or gas house gas. These hydrocarbon resins have been described in a pamphlet published in August, 1944 by Pennsylvania Industrial Chemical Corporation. For convenience, said resins are designated as "A" resins.

Said phenol indene cumarone resins are described at page 1004 of "Handbook of Plastics."

All these suitable solutions are stable up to 200° C., at ordinary pressure of 760 mm. of mercury, and said solutions are stable and rubber-like when cooled to 25° C.

Instead of said polymerized methyl methacrylate resin, I can use any polymeric ester of alpha-substituted acrylic acid, including the esters stated in U. S. Patent No. 2,030,901, issued February 18, 1936, although I prefer to use said polymeric methyl methacrylate.

I prefer to dissolve the polymerized methyl methacrylate resin or the like, in finely divided form.

I prefer to use the "A" resins which are viscous liquids at ordinary room temperature of 25° C. The "A" resins which I use are wholly hydrocarbon in structure and are very resistant to alkalies and acids.

I can use a grade of said "A" resins whose melting point is 5° C. These "A" resins are of low molecular weight.

The phenol-indene cumarone resins, designated for convenience as "B" resins, are fully described in a booklet published in 1945, by The Neville Company, located at Neville Island, Pittsburgh, Pennsylvania. They are secured by condensing phenols with unsaturates of the cumarone-indene type of resin. I can use the grades of said "B" resins which solidify at −70° C. At ordinary room temperature of 25° C. this grade of "B" resin is a heavy viscous liquid. These "B" resins are hydrindyl phenol derivatives. The formula of pure hydrindyl phenol is $C_{15}H_{13}OH$. Another grade of "B" resin which I can use has a melting point of 25° C.–35° C., and an acid number of 30–45 and a pH from aqueous dispersion of 5.75–6.25. It is a good solvent for zein. The "B" resins which I use as solvents, are permanently thermoplastic and they are also of lower molecular weight than the polymer which is dissolved in said solvent.

Certain illustrative examples of the invention are stated below.

Example 1

One ingredient of the plasticizing composition is a grade of "A" resin which is designated in the trade as "A-5." At 20° C.–25° C., it is a low viscosity liquid which is a dissolving plasticizer for many resins. The other ingredient is scrap polymerized methyl methacrylate resin. 97 parts by weight of said "A-5" grade of "A" resin are heated in an open kettle and at normal atmospheric pressure of 760 mm. of mercury to 130° C. I then intermix 3 parts by weight of scrap polymerized methyl methacrylate resin with said heated "A" resin, with thorough stirring. The temperature of the mixture is then increased up to 200° C., with constant agitation, until all the polymerized methyl methacrylate resin has been dissolved, thus producing a clear and homogeneous and light-permeable liquid solution of light color. When the finely divided polymerized methyl methacrylate resin is thus added, said resin swells and softens and then disappears in the solvent. I can use a lower solution temperature as long as the polymerized methyl methacrylate resin or other polymerized ester is softened, by increasing the solution period. The solution is then allowed to cool to room temperature of 20° C.–25° C. At this temperature, the mixture is a homogeneous and viscous and jelly-like product, which has rubber-like properties, as previously stated. While the solution can be spread at any temperature, it is preferable to heat said solution to about 80° C.–100° C., in order to spread the same upon fabrics and other materials. This improved plasticizing material can be added to natural resins, to plastics including synthetic resins and natural rubber and the synthetic rubbers. I can plasticize natural rubber and synthetic rubbers such as said copolymer of butadiene and styrene, by adding the plasticizer thereto by mastication in an ordinary rubber mill or calendar. A uniform plasticized material is thus secured. The base material, such as natural rubber, said copolymer of butadiene and styrene, ethyl cellulose, etc., is thoroughly and uniformly intermixed with the plasticizer.

As an example, from 10%–60% of said plasticizer can be added to natural rubber, calculated upon the weight of the natural rubber, by mastication in a rubber mill or by means of a calendar. When added to said copolymer of butadiene and styrene, the weight of the plasticizer may be 25% of the weight of said copolymer.

The proportion of the polymerized methyl methacrylate resin in the plasticizing composition may be increased up to about 10% of the total weight of the "A" resin and the polymerized methyl methacrylate resin in this example. If the proportion of the polymerized methyl methacrylate resin is increased above this ratio when said "A" resin or "B" resin is the solvent, the plasticizing composition becomes stiff at 25° C. and it is difficult to handle.

Instead of using the "A-5" grade of said "A" resin alone, I can substitute other grades. For example, the "A" component of the plasticizing composition may consist of equal parts by weight of said A-5 grade and another grade which is known in the trade as A-50. The latter has a melting point of 50° C. I can also include some of the grade of said "A" resin in the "A" resin component of the plasticizer which has a melting point of 50° C.–100° C., as long as I secure said rubber-like and longitudinally and torsionally elastic plasticizer solution at 25° C.

*Example 2*

This is the same as No. 1, save that I substitute the "B" resin for the "A" resin. All these grades of "B" resins which I can use are viscous resinous oils, which are flowable at 20° C.-25° C.

*Example 3*

Since the grade of the "B" resin which is known in the trade as "ZC" is a solvent for zein, I can include zein in the composition. As an illustration, the composition can consist of 10-15 parts of zein, and 3 parts of polymerized methyl methacrylate resin, the remainder being said "ZC" grade, said proportions being by weight. The zein of this mixture can be cured by formaldehyde or by a product which yields formaldehyde, thus improving said rubber-like mass.

Since said "ZC" grade and other grades of said "B" resin are solvents for zein, I can plasticize zein, so as to produce a thermosetting composition, which is infusible up to 200° C. As an illustration, I can plasticize 10-15 parts of zein with a composition which consists of 3 parts of polymerized methyl methacrylate resin, the remainder up to 100 parts by weight being any of the above-mentioned grades of "B" resin.

After this composition has been made with the uncured zein, such zein is cured by means of formaldehyde or by a product which yields formaldehyde, using a hot cure, thus producing a thermosetting mass. I can apply the formaldehyde by adding paraformaldehyde to the hot and liquid mass at 150° C.-200° C. The paraformaldehyde decomposes so as to yield the necessary formaldehyde.

If the zein is not cured, this composition remains thermoplastic and it has said rubber-like properties.

If the zein is cured, it is finely and uniformly dispersed in the composition, and such thermosetting composition has even improved rubber-like qualities. This thermosetting composition can be heated to 200° C. without melting, and when so heated, it retains its rubber-like qualities. When heated to a suitable temperature above 200° C., this thermosetting composition decomposes without melting. It can be used as a coating material and for many other purposes. By regulating the proportion of cured zein, the final finished composition can be either thermoplastic or thermosetting, because a small percentage of cured zein does not change the composition from thermoplastic to thermosetting.

The finished compositions made with "A" resins have a very low acid number, either zero or close to zero.

When used for plasticizing rubber or synthetic rubbers, the plasticized material is thermoplastic prior to curing the rubber or the synthetic rubber or other curable plastic. When such plastic is cured, the finished composition is thermosetting in nearly every case.

Each of the improved plasticizer solutions or compositions made according to the disclosure herein is permanently thermoplastic and it can be repeatedly melted and solidified, without losing its plasticizing properties. I can add the improved plasticizers to the materials to be plasticized at a temperature of 80° C.-100° C., in the form of a hot melt which is free from volatile solvents. I can also add the improved plasticizers as a hot melt at temperatures above 100° C. I can also add the improved plasticizers at ordinary room temperature of 25° C. in the form of a solution instead of in the form of a hot melt, by dissolving the improved plasticizers in various chlorinated hydrocarbons, in which the ingredients of the improved plasticizers are soluble.

If tricresyl phosphate is used, I can dissolve up to about 15 parts by weight of said polymerized methyl methacrylate resin in the tricresyl phosphate, while retaining said rubber-like properties at 25° C.

Much superior results are secured by using said "A" and "B" resins, and these preferred solvents form a special and highly desirable sub-class of solvents.

If the plasticizing mixture is added in the form of a solution in a volatile solvent to the natural rubber or synthetic rubbers or the like, the volatile solvent evaporates, so that the material is finally plasticized by said rubber-like plasticizing mixture.

Tricresyl phosphate has a boiling point of 275° C.-280° C. at 20 mm. pressure, and dibutyl tartrate has a boiling point of about 204° C. at 26 mm. pressure. Hence these ingredients are not volatilized under conditions of normal plasticizing use, and such ingredients are retained in the plasticized material.

Tributyl phosphate has a boiling point of 177° C.-178° C. at 27 mm. pressure, and dibutyl sebacate has a boiling point of 344° C.-345° C. at 760 mm. pressure.

Hence, in distinguishing between solvents which are suitable or unsuitable for making said rubber-like masses, the boiling point is not the distinguishing factor. The fact is that some solvents are compatible with said polymerized methyl methacrylate resin to produce said rubber-like mass, while other solvents whose boiling point is above 200° C. at 760 mm. pressure are non-compatible.

When I refer to plasticizing material in a claim, I include a mixture of plasticizers, such as a mixture of different grades of "A" resin. Such plasticizer is a resin which is a liquid at 25° C., and it is substantially non-volatile up to 200° C., at standard pressure of 760 mm. of mercury. At 25° C., the mixture of polymeric acryl resin and plasticizing material is therefore free from volatile ingredients, or at least, sufficiently free from volatile ingredients to provide a rubber-like mass which has tensional and torsional elasticity.

I have disclosed preferred embodiments of my invention, but numerous changes and omissions and additions can be made without departing from its scope.

I claim:

1. A permanently thermoplastic mixture of a thermoplastic polymeric acrylic ester resin and plasticizing material for said polymeric acrylic ester resin, said mixture being a stable and uniform rubber-like mass at 25° and having torsional and longitudinal elasticity at 25° C., said plasticizing material being a modified coumarone-indene resin which is a condensate of a phenol with an unsaturate of a coumarone-indene resin, said plasticizing material being liquid at 25° C. and being substantially non-volatile up to 200° C. at a standard pressure of 760 mm. of mercury, said mixture being stable up to 160° C. at said pressure, and being pourable at 150° C.-160° C.

2. A permanently thermoplastic mixture according to claim 1, in which said polymeric acrylic ester resin is methyl methacrylate polymer, and the maximum weight of said methyl methacrylate polymer is substantially ten per cent of the weight of said mixture.

3. A new mixture comprising the mixture according to claim 1, said plasticizing material being also a solvent for uncured zein, said new mixture also including cured zein which has been cured by means including formaldehyde and heat while dissolved in said plasticizing material.

JOSEPH R. EHRLICH.

REFERENCES CITED

The following references are of record in the file of this patent:

UNITED STATES PATENTS

| Number | Name | Date |
| --- | --- | --- |
| 2,413,259 | Soday | Dec. 24, 1946 |